Sept. 6, 1966     T. R. CASSEL     3,270,992

EXHAUST SYSTEM HANGER

Filed Oct. 5, 1965

INVENTOR.
Thomas R. Cassel
BY
J. L. Carpenter
ATTORNEY

United States Patent Office 3,270,992
Patented Sept. 6, 1966

3,270,992
EXHAUST SYSTEM HANGER
Thomas R. Cassel, Birmingham, Mich., assignor to General Motors Corporation, Detroit, Mich., a corporation of Delaware
Filed Oct. 5, 1965, Ser. No. 493,143
3 Claims. (Cl. 248—60)

This invention relates to an improved flexible hanger for vehicle exhaust systems.

It is known to provide hangers for flexibly supporting an exhaust system on a vehicle to reduce the transmission of vibrations from the exhaust system to the passenger compartment. These hangers generally include a loop member of flexible material rigidly attached to spaced mounting brackets which are secured to the vehicle body and to the exhaust system. Such hangers are effective to partially damp exhaust system vibrations by flexure of the loop member.

This invention completely damps such vibrations by providing a body mounted support member which frictionally grips the loop member. The loop member both flexes and slidably moves relative to the support member when the exhaust system vibrates. The friction losses associated with this movement, in addition to the flexure losses, are effective to completely damp the exhaust system vibrations.

One feature of this invention is that it provides a hanger which completely dissipates the vibrational energy of a vehicle exhaust system. Another feature is that the hanger includes a loop member of energy absorbing flexible material which is frictionally gripped by a support member but is free to move relative to the support member under vibratory conditions. Yet another feature of the invention is that the exhaust system vibrational energy is dissipated by frictional losses resulting from relative movement between contiguous surfaces of the hanger component parts.

The features of the invention will be apparent from the following description taken in conjunction with the accompanying drawings wherein.

Figure 1:
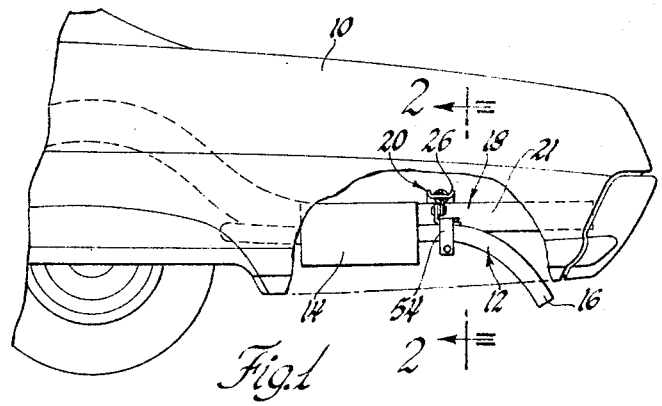
FIGURE 1 is a partially broken away partial view of a vehicle having an exhaust system embodying a hanger according to the present invention.

Referring to FIGURE 1, a conventional motor vehicle 10 has a conventional exhaust system 12 which includes a resonator 14 and a tail pipe 16. The exhaust system is located generally longitudinally of the vehicle and is attached to and supported from the frame 18 by an exhaust system hanger 20, according to this invention.

Figure 2:
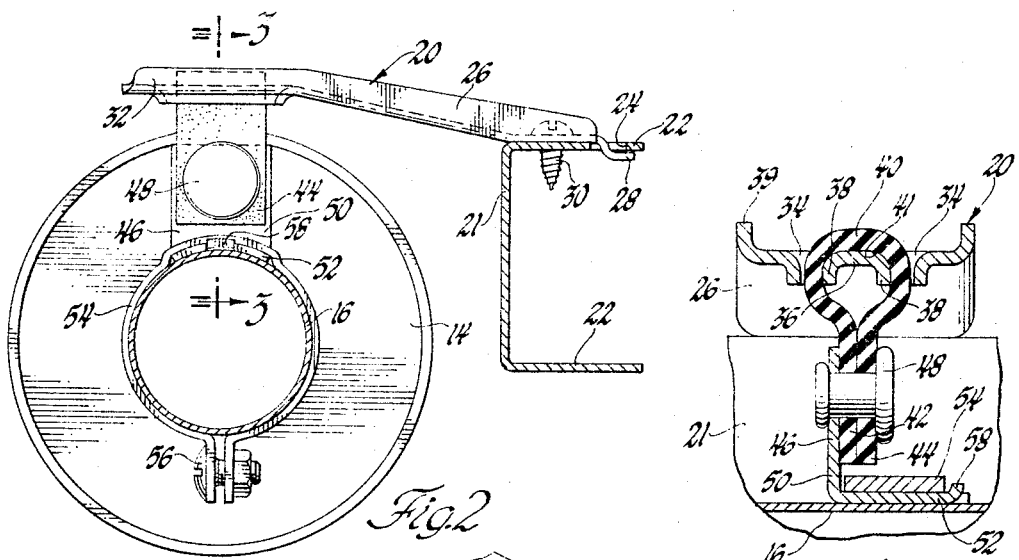
FIGURE 2 is an enlarged view taken generally along the plane indicated by line 2—2 of FIGURE 1.
Figure 3:
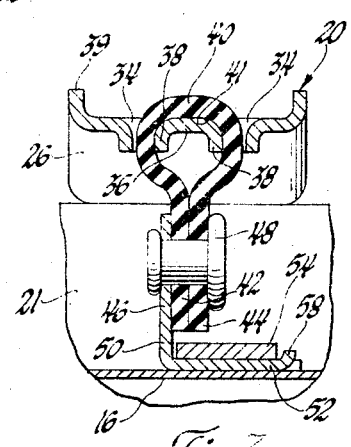
FIGURE 3 is a view taken generally along the plane indicated by line 3—3 of FIGURE 2.
Figure 4:
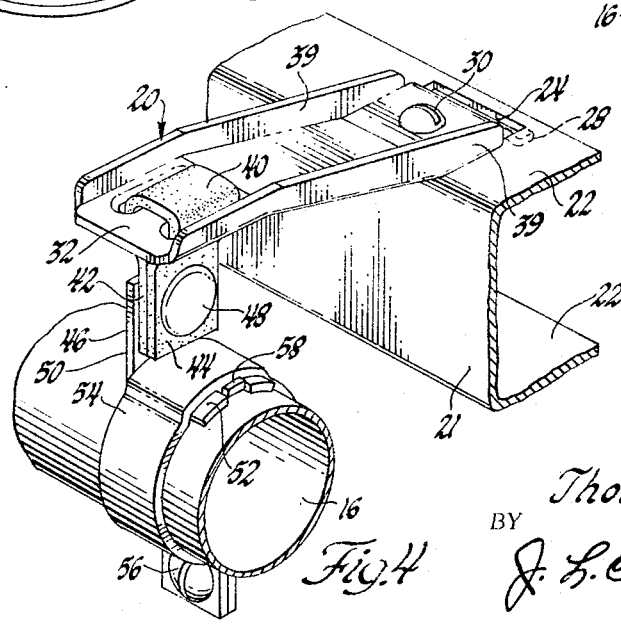
FIGURE 4 is a perspective view.

The frame 18 is of conventional construction with a side rail 21 which has upper and lower inwardly extending flanges 22. A positioning slot 24 is located in the upper flange. As seen in FIGURE 2, the exhaust system hanger 20 includes an upper mounting bracket 26 which is preferably made of metal and has a tab member 28 which is received within the slot 24 to locate the bracket longitudinally along the frame. The bracket is secured to the upper flange 22 by any conventional means, such as the screw 30. A cantilevered arm 32 of the bracket extends outward from the frame and includes a pair of spaced extruded slots 34 located parallel to each other and oriented so as to extend transversely to the longitudinal axis of the tail pipe. The web segment 36 of the arm between the two slots is generally flat, but has curved outer edges which extend into downwardly projecting flanges 38. Upwardly turned flanges 39 along the outer edges of arm 32 are provided to lend structural strength to the arm.

An insulator 40 comprises a flexible loop member, preferably tire carcass, which is looped through the slots 34 in a manner such that the insulator passes over and is supported by the web segment 36. Relative movement between the insulator and the arm is resisted by the frictional force between the web segment 36 and the inner surface 41 of the insulator. The insulator end portions 42 and 44 abut and are securely fastened together and to a lower mounting bracket 46 by a rivet 48 to form a closed loop.

The mounting bracket 46 is generally L-shaped with vertical and horizontal extending legs 50 and 52 respectively. The horizontal leg 52 extends longitudinally of the tail pipe and is located adjacent thereto. The leg 52 is arcuate in cross section and conforms to the outer circumference of the tail pipe. A clamp 54 extends around the tail pipe and the leg 52 and is tightened thereabout by a bolt 56 to secure the tail pipe to the bracket 48. An upwardly turned tab 58 locates the clamp upon the leg 52 and prevents its accidental disengagement therefrom.

When the vehicle is operated, vibrations are transmitted to the exhaust system. A portion of the vibrational energy is dissipated by flexure of the loop member 40. The remaining portion is dissipated through friction losses associated with the relative movement between the insulator 40 and the web segment 36. The energy losses, in total, are equal to the amount of vibrational energy introduced into the exhaust system.

Thus, this invention provides an improved exhaust system hanger.

I claim:

1. Hanger means for connecting a vehicle exhaust system to a vehicle body comprising, a support member mounted on said body and provided with a pair of openings therein, a loop member of flexible material received through said openings and having a surface thereof frictionally engaging the portion of said support member intermediate said openings, and means securing said exhaust system to said loop member, said loop member being relatively movable with respect to said portion of said support member in response to exhaust system vibrations to thereby frictionally damp said vibrations.

2. Hanger means for mounting a vehicle exhaust system on a vehicle body comprising, an elongated support member, means mounting said member adjacent one end thereof on said body to locate said member in cantilever relationship to said body, said member being provided with a pair of openings adjacent the other end thereof, a loop member of flexible material having the legs thereof extending through said openings and the loop portion thereof seating on said support member intermediate said openings, and means securing the legs of said loop member to said exhaust system, flexure of said loop member and frictional movement of said loop member relative to said support member absorbing the exhaust system vibrational energy.

3. Hanger means as recited in claim 2 wherein said openings are spaced extruded slots and said loop member seats on the web segment of said support member between said slots.

References Cited by the Examiner

UNITED STATES PATENTS

| | | | |
|---|---|---|---|
| 1,603,597 | 10/1926 | Harris | 248—18 X |
| 2,641,425 | 6/1953 | Ostberg | 248—18 |
| 2,744,706 | 5/1956 | Gerdry | 248—60 |
| 2,981,351 | 4/1961 | Knickerbocker et al. | 180—64 |
| 3,126,575 | 3/1964 | Schoeneberg | 248—317 X |
| 3,161,252 | 12/1964 | Brown | 180—64 |

FOREIGN PATENTS 508,248　12/1954　Canada.

CLAUDE A. LE ROY, *Primary Examiner.*